(12) United States Patent
Trinko et al.

(10) Patent No.: US 8,290,705 B2
(45) Date of Patent: Oct. 16, 2012

(54) MOBILE NAVIGATION SYSTEM WITH GRAPHIC CRIME-RISK DISPLAY

(75) Inventors: Thomas Trinko, Menasha, WI (US); Paul Hager, Stoughton, WI (US); Keith Baxter, Brookfield, WI (US)

(73) Assignee: Rio Sisa Idea Farm, Menasha, WI (US)

( * ) Notice: Subject to any disclaimer, the term of this patent is extended or adjusted under 35 U.S.C. 154(b) by 530 days.

(21) Appl. No.: 12/597,425

(22) PCT Filed: Apr. 25, 2008

(86) PCT No.: PCT/US2008/061482
§ 371 (c)(1),
(2), (4) Date: Oct. 23, 2009

(87) PCT Pub. No.: WO2008/134460
PCT Pub. Date: Nov. 6, 2008

(65) Prior Publication Data
US 2010/0100319 A1    Apr. 22, 2010

Related U.S. Application Data

(60) Provisional application No. 60/913,894, filed on Apr. 25, 2007, provisional application No. 60/990,113, filed on Nov. 26, 2007.

(51) Int. Cl.
*G01C 21/26* (2006.01)
(52) U.S. Cl. ...... 701/454; 701/468; 701/532; 340/995.1
(58) Field of Classification Search .......... None
See application file for complete search history.

(56) References Cited

U.S. PATENT DOCUMENTS

| 5,781,704 | A | * | 7/1998 | Rossmo ...................... 706/45 |
| 5,802,492 | A | | 9/1998 | DeLorme et al. |
| 6,175,803 | B1 | * | 1/2001 | Chowanic et al. ........... 701/533 |
| 6,615,133 | B2 | | 9/2003 | Boies et al. |
| 6,650,972 | B1 | * | 11/2003 | Robinson et al. ............. 701/3 |
| 7,149,533 | B2 | | 12/2006 | Laird et al. |
| 2004/0034666 | A1 | * | 2/2004 | Chen ...................... 707/104.1 |
| 2005/0086088 | A1 | | 4/2005 | Stiles et al. |
| 2006/0247852 | A1 | * | 11/2006 | Kortge et al. ................ 701/209 |
| 2010/0036610 | A1 | * | 2/2010 | Urciuoli et al. .............. 701/213 |

FOREIGN PATENT DOCUMENTS

| JP | 2006184030 | 7/2006 |
| KR | 1020060113135 | 11/2006 |

OTHER PUBLICATIONS

Lee, Hyeon Hong, PCT International Search Report dated Aug. 27, 2008, Korean Intellectual Property Office, Seonsa-ro, Seogu, Daejeon, Republic of Korea.

* cited by examiner

*Primary Examiner* — Michael J. Zanelli
(74) *Attorney, Agent, or Firm* — Boyle Fredrickson, S.C.

(57) ABSTRACT

A navigation system for mobile use includes street map data used for creating a dynamic map display tracking movement of the vehicle and includes crime data used to provide an overlay on the dynamic display indicating a risk of crime to the vehicle's occupants from the surrounding area. Crime data may be harvested from police websites and/or generated using statistical correlation techniques from other proxy information. Presented crime data indicate crime risk, type of crime, crime date or time of occurrence, and linkage to environmental conditions such as type of weather, temperature, and moonlight.

14 Claims, 6 Drawing Sheets

MOBILE NAVIGATION SYSTEM WITH GRAPHIC CRIME-RISK DISPLAY

CROSS REFERENCE TO RELATED APPLICATION

This application claims the benefit of U.S. provisional application 60/913,894 filed Apr. 25, 2007, the U.S. provisional application 60/990,113 filed Nov. 26, 2007, and PCT Application PCT/US2008/061482 filed Apr. 25, 2008, all hereby incorporated by reference.

BACKGROUND OF THE INVENTION

The present invention relates to navigation devices for use by travelers and in particular to a navigation system which provides the user with a graphic representation of the crime risk in the immediate environment.

GPS and other navigation systems for portable use may contain digital maps of specific areas and may superimpose a user's location determined by the GPS on a graphical representation of the map. While the maps used in GPS systems currently are relatively static, it is also known to provide an ability to download updated or new maps with the GPS system to keep the loaded map system current, to load new maps for new areas or use wireless or cellular technology to exchange map information. The maps may include points of interest, restaurants, and other data likely to be useful to the traveler.

Such systems are in particular demand by users who are unfamiliar with the roads in an area, and for this reason are particularly attractive to travelers and offered as a feature in rental cars. A traveler with a GPS system and an updated map, however, may have a false sense of security based on a knowledge of their location on the map but an ignorance about the safety of that location.

SUMMARY OF THE INVENTION

The present invention provides a GPS system that provides a graphical display of the risk of criminal activity in the area to put a traveler to an unfamiliar city on a more equal footing with those more familiar with the area. Such data, by giving travelers a more complete picture of their surroundings, can assist the traveler in making informed decisions about travel routes, stopping points, and schedules. The graphical display of criminal activity risk can distinguish between different types of criminal activities, the severity of the risk, the geographic scope of the risk, and even the risk as a function of time of day.

Significantly, the present invention also provides a method of obtaining detailed crime data on a contemporaneous basis from diverse public sources and for using that crime data for route planning purposes and informational display.

Specifically then the present invention provides a method and apparatus for improving traveler safety comprising in which a GPS receiver is used to obtain substantially real time location information related to a position of the vehicle holding the GPS receiver. A dynamic display of a street map following the position of the vehicle using stored street map data is together with multiple shaded zones in the dynamic display of the street map, the multiple shaded zones depicting the crime data in the locations of the shaded zones using stored crime data linked to locations. The data may also be displayed with points of interest with accompanying information about crimes in that area.

It is thus one object of the invention to provide a traveler who is new to the area a guide respect to crime danger associated with particular locations.

The crime data may be derived from crime data provided on publicly accessible websites operated by governmental entities or from publicly available data sources or websites which collect data from public sources or individual reports It is thus another object of the invention to provide a method of obtaining accurate crime data in a cost-effective manner.

The crime data may be derived from non-crime data correlated to crime data provided on publicly accessible websites It is thus another object of the invention to provide for proxy crime data for areas where crime date is not currently collected by governmental entities. Use of other information which has a proven link to crime rates may be used.

The crime data may include severity of crime and a shading of the shaded zones maps to different degrees of crime severity. The shading may be implemented by a density of POI markers (point of interest) depending on the density of crime.

It is thus an object of the invention to allow the user to make a personalized risk assessment.

The crime data may be linked to time of day and the multiple shaded zones may depict the crime data only for a current predetermined time range. The crime data and map overlays may change color schemes to reflect the crime within that time of day.

It is thus an object of the invention to provide a realistic indication of crime that distinguishes between day and night time crime rates.

The crime data may be further linked to date and the multiple shaded zones may depict the crime data only for a current range of dates.

It is thus an object of the invention to provide an accurate assessment of seasonal type crimes.

The crime data may further be linked to environmental conditions including at least one of: air temperature, phase of the moon, precipitation and wherein the multiple shaded zones depict the crime data only for corresponding environmental conditions.

It is thus an object of the invention to improve the predictive power of the crime assessment by considering factors other than location The shaded zones provide a shading reflecting an aerial density of a particular crime type.

It is thus an object of the invention to provide a multidimensional portrayal of crime risk.

The street map may identify limited access highways and the shading of the shaded zones may exclude a predetermined distance from limited access highways.

It is thus an object of the invention to reflect the lower risks to a traveler of traveling along a limited access highway to a high crime zone.

The street map magnification may be reduced when crime statistics are displayed to provide for any meaningful statistical crime sample.

It is thus an object of the invention to provide an accurate representation of crime risk to unsophisticated users.

These and other object of the invention may apply to only some embodiments described herein and thus should not be used to define the scope of the invention.

Often on location based devices each road segment is given a unique code used for routing purposes. The invention also provides the ability to establish a threshold for what is unsafe and code each road segment as a 0 or 1 (or some other flag) to indicate whether that road is safe. In this way safety based routing can be determined and a user can be presented with the option to take the most safe route or when routing be presented with the information that their route would take the person through areas with high crime.

DETAILED DESCRIPTION OF THE PREFERRED EMBODIMENT

Figure 1:
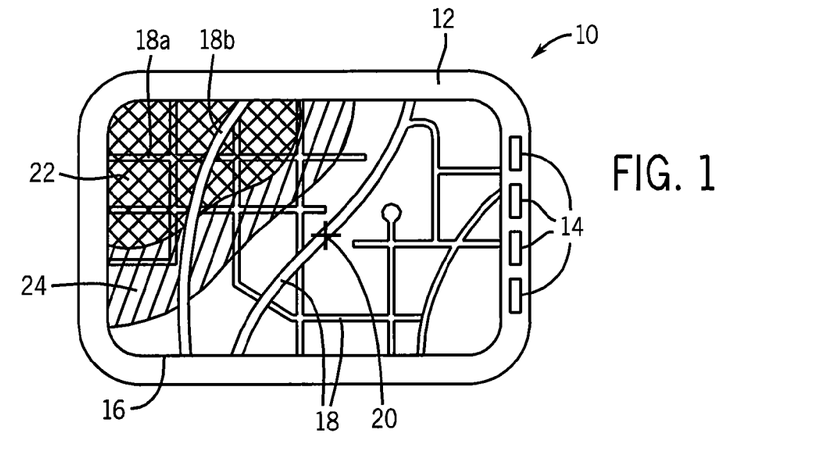
FIG. 1 is a simplified figure of a display of a GPS device per the present invention showing by shaded areas a graphical representation all of criminal risk.

Referring now to FIG. 1, a mobile navigation device 10 of a type that may be mounted in a car or the like may provide a housing 12 supporting one or more user controllable buttons 14 on the side of a color graphic display 16. As is generally understood in the art, the display 16 may depict a map showing streets 18 and a cursor 20 showing the location of the vehicle. The orientation of the streets may change to show the direction of travel of the vehicle according to standard conventions, for example, the direction of travel being vertical on the display 16.

The present invention may further provide for a first and second zone of shading 22 and 24 superimposed on the map and depicting a measure of the crime in the vicinity of the cursor 20. The shading may be different brightnesses, colors, or highlighting, a density of points (either randomly placed or each indicating a crime), or simply boundary markings according to techniques well known in the art and may cover particular streets 18 (to be visually in front of the street) or be covered by the street (to be visually behind the street) reflecting the degree to which the crime risk indicated by the shading affects those on the street.

For example, a local street 18a might be covered by shading 22 denoting a likelihood of auto theft. This is because auto theft would affect anyone parking on the local street 18a. Conversely, a limited access highway 18b may be positioned visually in front of the shading 22 denoting a likelihood of auto theft, because travelers on the highway 18b would not be susceptible to problems of auto theft. A shading 24 denoting weapon crimes, on the other hand, might cover limited access highway 18b to the extent that such activity reflects a more significant risk to highway travelers.

Figure 2:
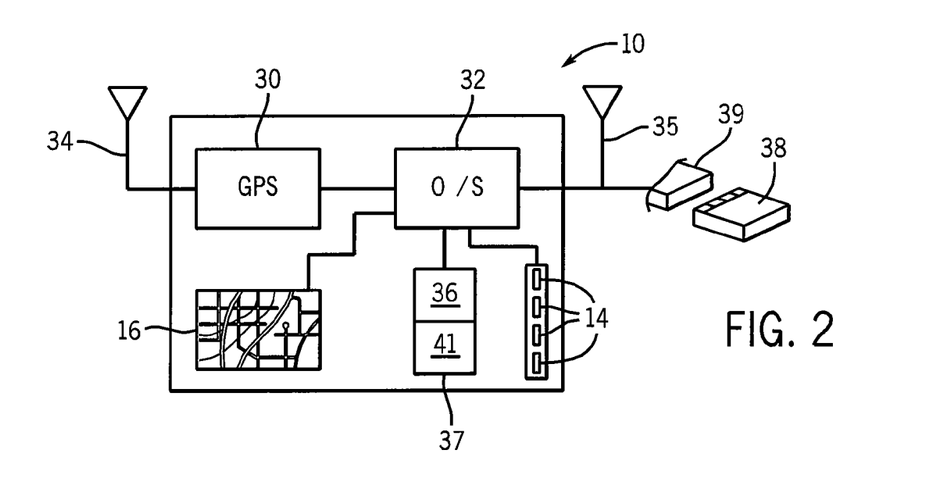
FIG. 2 is a block diagram of the components of the GPS system of FIG. 1 including map and crime data memories.

Referring now to FIG. 2, the mobile navigation device 10 may employ standard GPS electrical architecture including a GPS receiver 30 communicating with a microcontroller 32 executing a standard operating system program. The GPS receiver may receive a GPS signals through a GPS antenna 34 and relay position information and time information to the microcontroller 32. The microcontroller 32 may in turn control the display 16 to output the map of FIG. 1, for example, according to map data 36 held in a memory 37 and according to the time and position information from the GPS receiver 30. The microcontroller 32 may also include an antenna 35, or a socket 39 for standard memory card 38, or other media input allowing downloading of map data 36 and crime risk data 41 into the mobile navigation device 10.

This crime risk data 41, as will be described, provides data compatible with the map data 36 to produce the shadings 22 and 24 described above. In particular the crime risk data 41 may provide for geographic coordinates demarcating zones of crime risk represented by areas of the shading 22 and 24, crime risk types represented by colors, textures, or brightness of the shading 22 and 24, and crime risk severity also represented by colors, textures or brightnesses or images. Different crime risk data 41 for a given location may be keyed to different times during the day, for example, business hours and after the business hours as will be described below. Alternatively or in addition the crime risk may be keyed to dates or ranges of dates to reflect seasonal variations, for example, weather or tourist influx. Alternatively, when the crime data is collected it may be linked to environmental conditions such as air temperature, phase of the moon, precipitation, local terrain, or land use including zoning. For GPS systems that provide updated weather information be presented crime data may be adjusted to conform to those current environmental conditions. The crime risk types may include and distinguish among, for example, auto theft, assaults against persons, drug arrests, traffic violations such as speeding, and the like. In addition non-crime data proxies may be provided such as population density, average income, density of government buildings and police stations, and the like.

Figure 3:
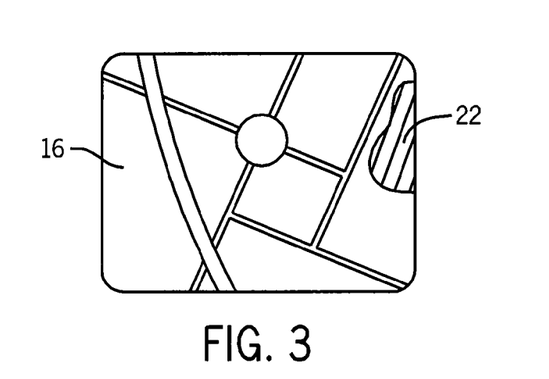
FIG. 3 is a figure similar to that of FIG. 1 showing the GPS display at a first time of day.
Figure 4:
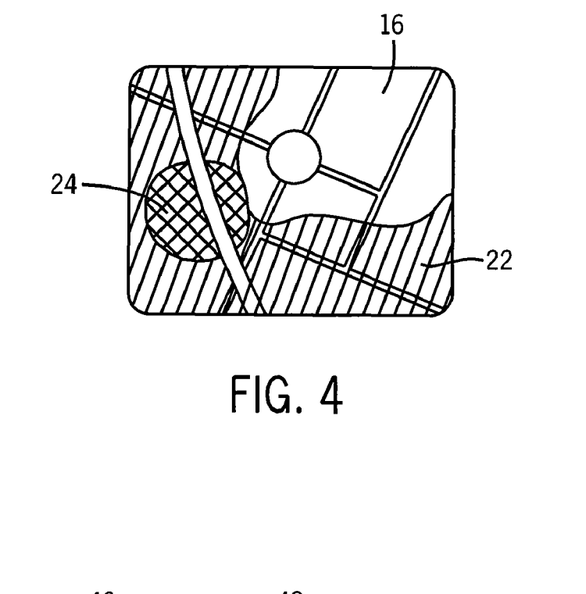
FIG. 4 is a figure similar to that of FIG. 3 showing the GPS display at a later time of day.

Referring now to FIGS. 3 and 4, the keying of crime data to different times of the day allows the display 16 to provide for different crime shadings 22 and 24 depending on the time derived from a clock of the GPS receiver 30. For example, during business hours, as shown in FIG. 3, a crime zone of shading 22 might be fairly isolated representing streets that are not main thoroughfares or the like, whereas at a later time as shown in FIG. 4, for example, after the normal business day, crime zone of shading 22 may increase and a new zone of crime shading 24 may appear. The user may be given a feature allowing them to accelerate the clock to look at the transition of crime during the day in animated form. In one display mode, the animation may cycle through the current day with a depiction of the time of day so as to give the user an indication of changes in crime patterns that they may experience in that area.

Figure 5:
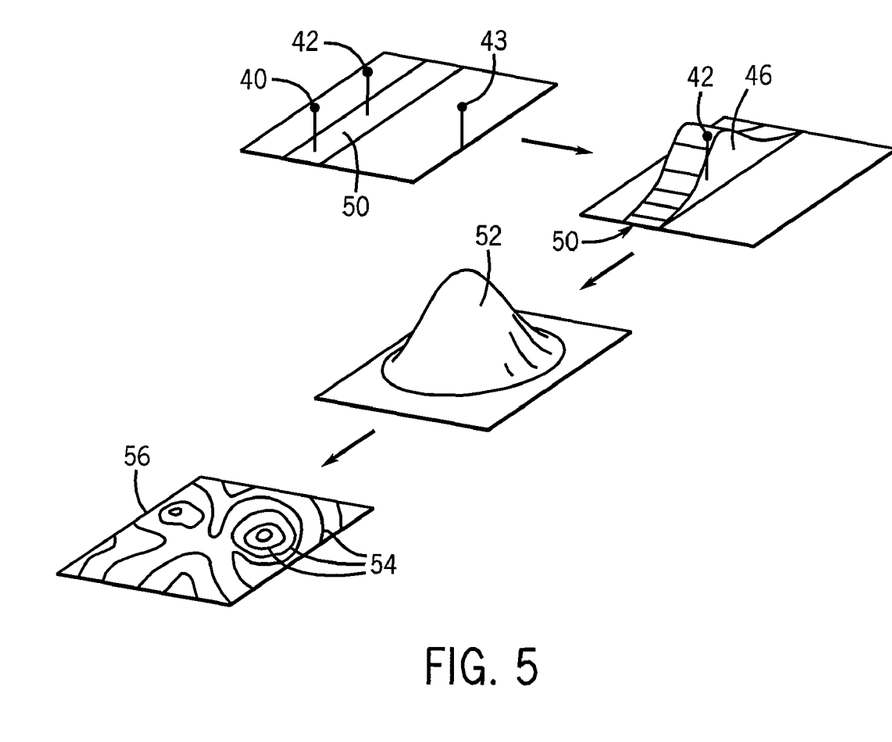
FIG. 5 is a set of graphical representations of the transformation of point crime data into the crime mapping of the present invention.

Referring now to FIG. 5, crime data may be obtained from a variety of public sources, generally as crime points 40, 42 or 43 where a given crime will be identified as to type, time of day and date, and location on a geographic grid 44. This data may retained as point data indicating an incident of a crime type (for example through color) and its location, or may be turned into a real crime shadings 22 and 24 through the use of a first two-dimensional convolution kernel 46 applied to each crime point 40, 42 and 43 (only crime point 42 shown for clarity) where the two-dimensional convolution kernel 46 is aligned with each transportation corridor 50 on the grid 44 reflecting a general propensity of crime risk to travel with people along transportation corridors. In this case, a simple two-dimensional Gaussian curve may be used as the convolution kernel 46 reflecting a general fall off of crime as one moves away from the crime scene. A sum of the results of the two-dimensional convolution kernel 46, applied to each crime point 40 42 and 43, for each transportation corridor 50, may then be modified by a general blurring convolution kernel 52 which provides a smooth continuity of crime risk over broader area. The height of the surface created after the convolution by kernel 52 may be represented by iso-crime lines 54 assigning both spatial extent and risk to each particular crime type.

As will be understood, a crime map 56 is created from the iso-crime lines 54 and stored in the mobile navigation device 10. A crime shading 22 or 24 can then be created by applying a predetermined threshold to the crime map including the area within iso-crime lines 54 greater than or equal to this threshold. Typically this threshold will be set by the manufacturer but may be adjusted by the user to allow their risk propensities to be respected.

In cases where the crime data is sparse at the given magnification of the map, invoking the crime data it may cause a zooming out all the map to a resolution were meaningful crime statistics can be displayed. The user may set the thresholds for the amount of crime risk to be displayed and the types of crime to be displayed, for example opting to show only severe crime risks or crime risks key to the current time of day, range of dates, or environmental conditions. The user may opt to view only actual crime data or actual crime data and crime data derived from proxy sets as will be described.

The crime maps of 56 may be updated periodically and provided to subscribers to give them ongoing indications of possible risks.

Figure 6:
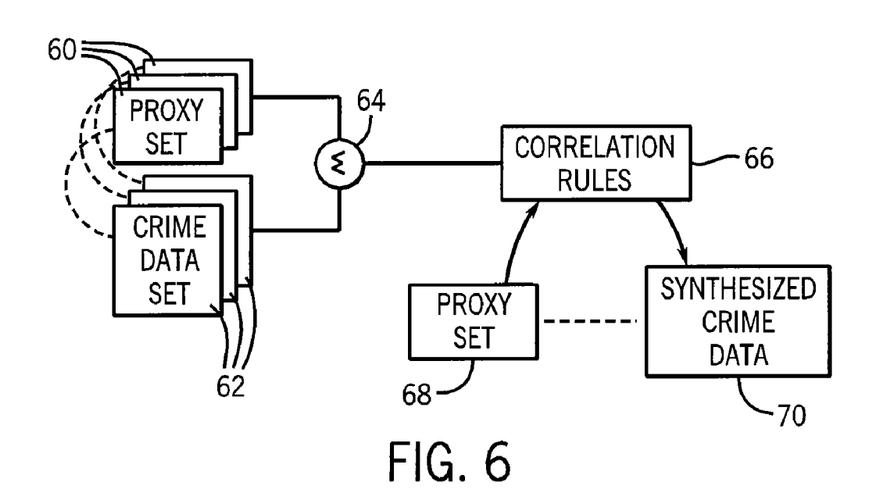
FIG. 6 is a flow chart showing statistical development all of crime data from crime proxies.

Referring now to FIG. 6, not all jurisdictions provide crime data and there may be some situations where crime data provided by a particular area is suspect or incomplete. In these cases the user may still be provided with crime shadings 22 and 24 by using a statistical process in which more readily available data termed "proxy sets" 60 are collected for various geographical regions. These proxy sets may include, for example, standard census data including population density and income ranges, and may be augmented with commercially available data such as home prices, loan defaults, insurance claims, and the like. Without the need to understand the sociological implications of this demographic data, the proxy sets 60 may be correlated to known crime data 62 for the same regions by a correlation process 64 of type well known in the art to produce a set of correlation rules 66 relating one kind of data to the other. For example, through standard regression, a formula may be developed equating the proxy set with particular crime risk. These correlation rules 66 may be applied to proxy sets 68 of other jurisdictions having unknown or suspect crime data to develop synthesized crime data 70 that may still provide the user with some guidance in areas where there would otherwise be no guiding data.

Figure 7:
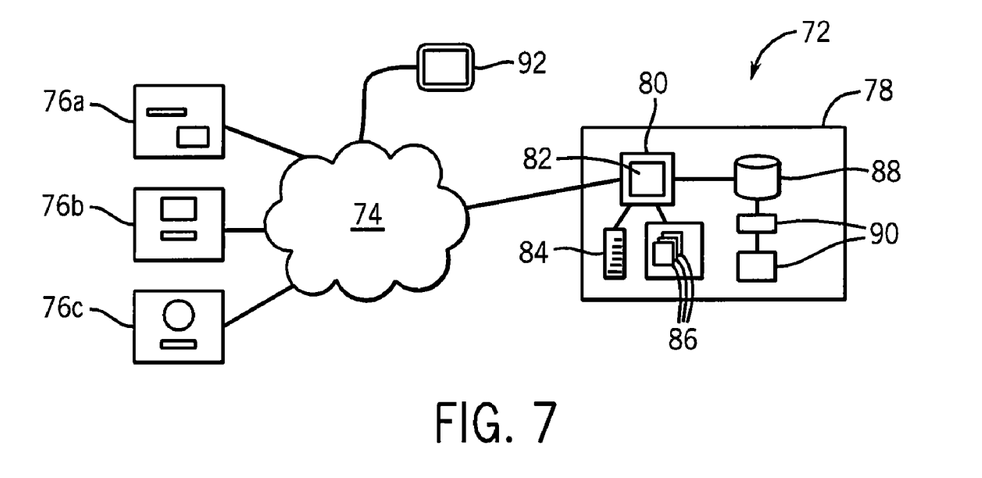
FIG. 7 is a block diagram of an extraction system for collecting comprehensive crime data on a real-time basis.

Referring now to FIG. 7, the collection of high-resolution crime data providing time place and crime type as is necessary to produce the present invention is hampered by two significant factors. First, in the United States, and in most countries, police activity is exclusively in the hands of local governments who therefore hold the exclusive right to the operation of a police force and the collection and dissemination of crime data. Such government entities operate outside of the private sector and can be indifferent to market demands to provide comprehensive and accessible crime data. The control of this data by local governmental entities can also create a disincentive to make crime data freely and easily available if that data may reflect poorly on local communities. These factors are reflected in the wide variety of different websites reporting crime data in a tabular form that requires entry of specific addresses before data will be released.

Accordingly, the present inventors have developed an extraction system 72 operating over the Internet 74 to interact with various different crime-reporting sites 76a-76c in the manner of an individual user capable of adapting to idiosyncratic user interfaces and of augmenting data as necessary. The extraction system 72 collects data and compiles it into a comprehensive view of the crime situation in a particular area.

Alternatively some governmental agencies would like to provide their crime data in a more graphical format but lack the resources or knowledge. Accordingly the present invention may involve the ability to allow localities to upload or transmit crime data in a variety of formats to the data extraction mechanism. In this way both current data and currently unavailable data may be added to create a more comprehensive system which covers a more broad geography.

In a preferred embodiment, the extraction system 72 comprises a Web connected computer 78 having a browser 80 executing a gathering program 82. The gathering program 82 employees a Web address list 84 holding URLs of the particular websites 76a-76c through which this data is provided. The gathering program 82 further includes a set of scripts 86 uniquely identified to one website 76 and that provides set of steps for iteratively extracting a full set of data from the particular website 76. The crime data extracted from the website is stored in a uniform format in a database 88 that may be also implemented on the extraction system 76. If the website requires authorization to access the database of information, login information can be extracted from the page by searching for text after the terms "user" and "password" if that cannot be found the server will check for a password to the site stored in the database. Alternatively if the website requires authorization or password which is protected by requiring a user to respond to a CAPTCHA. In this case either a user can oversee any CAPTCHA each time the server runs the gather process or alternatively the page with the CAPTCHA can be sent to a Amazon (or other company) providing a "Mechanical Turk" program where human operators are paid small amounts of money to do simple tasks that are difficult of a computer. In this manner the gatherer can function without direct user intervention by the server administrator. Or a server administrator may be required to assist the gatherer in obtaining the information. The gathering program may further be presented with graphical data which would then have to be interpreted by a human to code it properly. The gathering program may download the image and use software utilizing Optical Character Recognition to interpret the data on the screen and code it properly. The gatherer may also face instances where scraping from the screen is difficult because the data runs off the page and requires scrolling, in this instance the gatherer would take an image of the page, or detect the page width and length and make a determination on how far to scroll and then re-scrape the screen for information.

A map generation program 90 converts the data of the database 88 into the desired map formats and may download them again over the Internet 74 to particular users of GPS devices 92.

Figure 8:
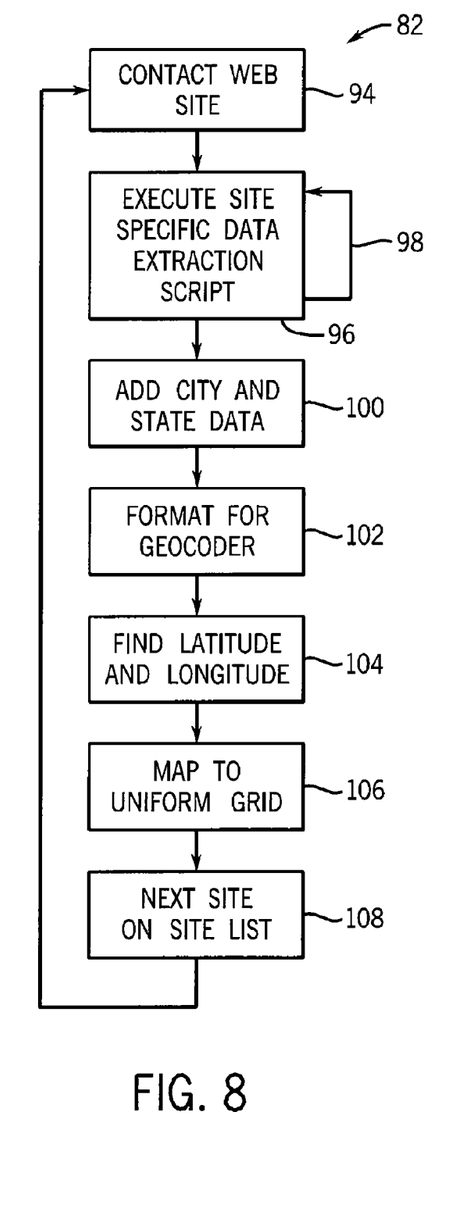
FIG. 8 is a flow chart of the program executed by the extraction system of FIG. 7.

Referring now to FIG. 8, the gathering program 82 may begin operation as indicated by process block 94 by contacting an individual website (for example 76a) identified for example by the first web address on Web address list 84. At succeeding process block 96, the gathering program 82 executes the particular script 86 necessary to extract the data from that websites 76a. The script 86 will typically execute repeatedly as indicated by arrow 98, for example, entering in each address on a given street to check the occurrence of crime at that address, if necessary. The scripts 86 will be customized to the particular websites 76 to extract crime type, crime location, and crime time.

At succeeding process block 100, additional data may be added to the extracted data from the script 86 itself to provide a complete picture of the crime incidents. Most typically, this added data will be a city and a state which are normally implicit in the data of the particular website 76 but not contained per se in the data output from that website 76. As noted, data is then formatted in a consistent form and provided to a geocoder 102, being a website that will take a street address and converted to a longitude and latitude value per process block 104. At the conclusion of this process, a data structure will be obtained and stored in the database 88 as indicated in the following Table 1.

to the grid described with respect to process block 106 above, then simply determines whether a particular crime incident 110 occurred within a particular UTM square 112, each UTM square 112 having a unique identifier 114. This mapping is precalculated at process block 106 for greater speed in map generation or done at this time for greater flexibility in determining types and times of crime.

Figure 9:
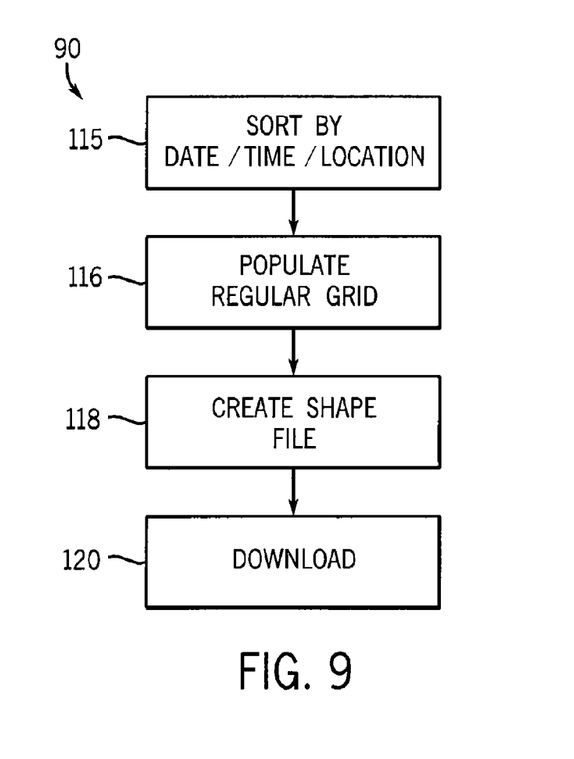
FIG. 9 is a flowchart of a map creator program used with the extraction system of FIG. 7.

Referring now to FIG. 9, the generation of a map may be performed on demand beginning at process block 115 where, for example, according to a user request, the data of the database 88 is sorted by map generation program 90 to obtain crime statistics in a particular area of the world (for example, as defined by a set of UTM numbers) at a particular time and date range. The date range may be dynamically adjusted to obtain a statistically significant sampling of data for the crime map weighting which is most current. In this respect, the data may span more than one year, for example, for seasonal data, looking at comparable seasonal crime during previous years to establish a trend line used to establish current crime values.

At process block 116, the sorted data, in one embodiment, is then used to populate a grid of UTM squares 112 within in

TABLE 1

| SAddress | City | State | Zip | Geo | CrimeCode | CrimeDes | Date/Time | UTM Square |
|---|---|---|---|---|---|---|---|---|
| 111 E WISCONSIN AV | Milwaukee | WI | 53202 | 43.038539, −87.909517 | 1 | ALL OTHER LARCENY | Oct. 16, 2007 08:11 AM | 34 |
| 1216 E BRADY ST | Milwaukee | WI | 53202 | 43.053092, −87.896512 | 5 | ALL OTHER LARCENY | Oct. 16, 2007 09:10 PM | 31 |
| 2066 N CAMBRIDGE AV | Milwaukee | WI | 53202 | 43.058249, −87.891785 | 5 | THEFT FROM MOTOR VEHICLE | Oct. 17, 2007 11:11 PM | 22 |
| 133 N JACKSON ST #233 | Milwaukee | WI | 53202 | 35.644868, −88.857165 | 1 | ALL OTHER LARCENY | Oct. 18, 2007 3:11 AM | 34 |

This data structure provides a particular address of a crime and the city, state, and (optionally) zip code, shown in the first through fourth columns. This information, when fed to the geocoder, provides a longitude and latitude value shown in the fifth column. A crime code is usually extracted from the website which provides a coding according to a standard FBI coding scheme or a variant on this scheme implemented by various localities. The script 86 translates these locally implemented codes into a standard FBI coding scheme and stores the code and a written description at columns 6 and 7. The date and time of the crime is also obtained and stored at column 8 to provide data specific to different seasons or times of the day. Whether data and almanacs may be consulted to add in information about environmental conditions for example air temperature, phase of the moon, precipitation that may improve the predictive power of the crime data when it is displayed. Thus, for example, when there is a new moon at night crime data may increase for some types of crime.

The program 82 next calculates a UTM grid value, as will be described below, identifying a regular region (e.g. a grid square) in which the crime occurred. This is indicated by process block 106 and added to the data structure at column 9.

At process block 108, after all the data is extracted from a given website 76a, the next site in the list 84 is accessed and this process is repeated. The extraction system may operate at regular intervals during the day preferably at times of low Internet use.

Figure 10:
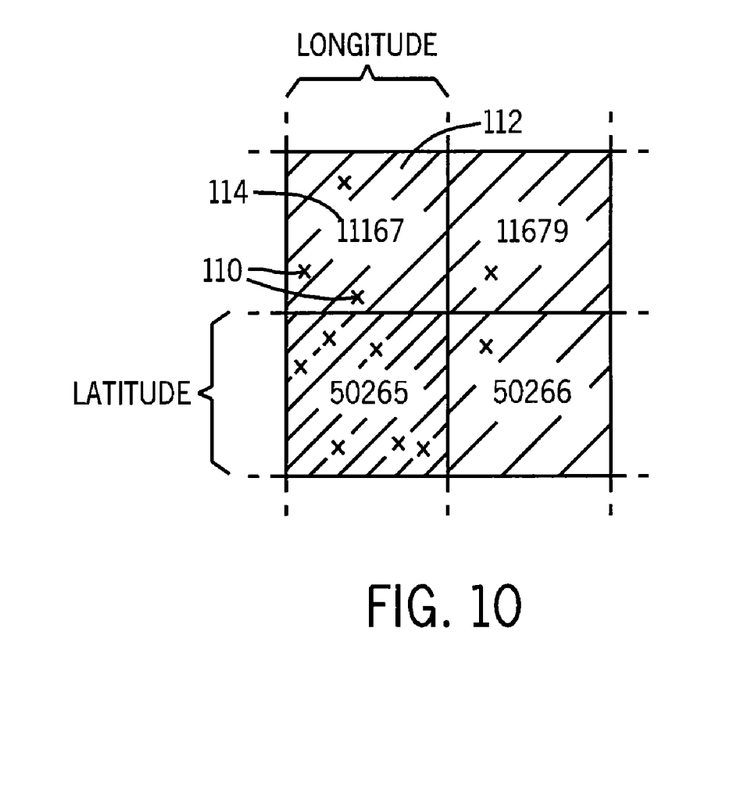
FIG. 10 is a schematic diagram of a shape file created by the map creator program of FIG. 9.
Figure 11:
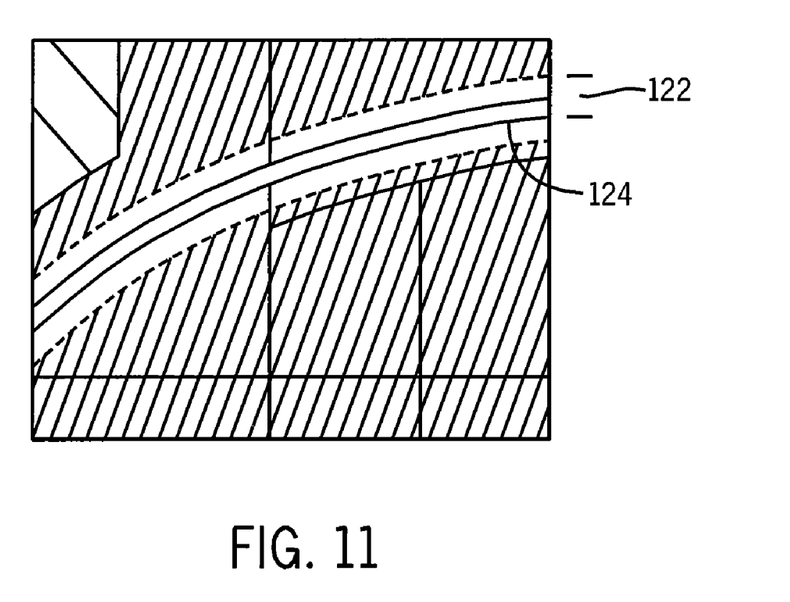
FIG. 11 is a figure similar to that of FIG. 1 showing accommodation of limited access highways in the display of the present invention.

Referring now to FIG. 10, a crime map may be generated from the data structure of Table 1 by dividing the world into regular polygons, in this case squares having a width and height of 0.005° of longitude or latitude or any size block depending on the granularity which is desired. The mapping area to the desired map. The number of crime incidents in each UTM square 112 is then mapped to a color for the square, for example, green shades indicating relatively low crime rates and red shades indicating relatively high crime rates according to standard mapmaking conventions.

The color values all the UTM squares 112 are then assembled to create a shape file in a vector format defining polygons having vertices and a particular translucent shading value as determined by the number of crime incidents 110. This shape file creation is indicated at process block 118. The shape file may then be downloaded, as indicated by process block 120 to a GPS user and provides an overlay on existing maps already held in the GPS device and in a format that may be readily interpreted by most GPS systems.

Referring now to FIGS. 8 and 9, the shape file created at process block 118 may include a margin 122 around limited access highways 124 reflecting the fact that local crime statistics usually do not affect high-speed traffic on busy highways that may go through those neighborhoods. This margin 122 may increase as the scale of the map is increased to provide a visual indication of this feature for travel planning.

Figure 12:
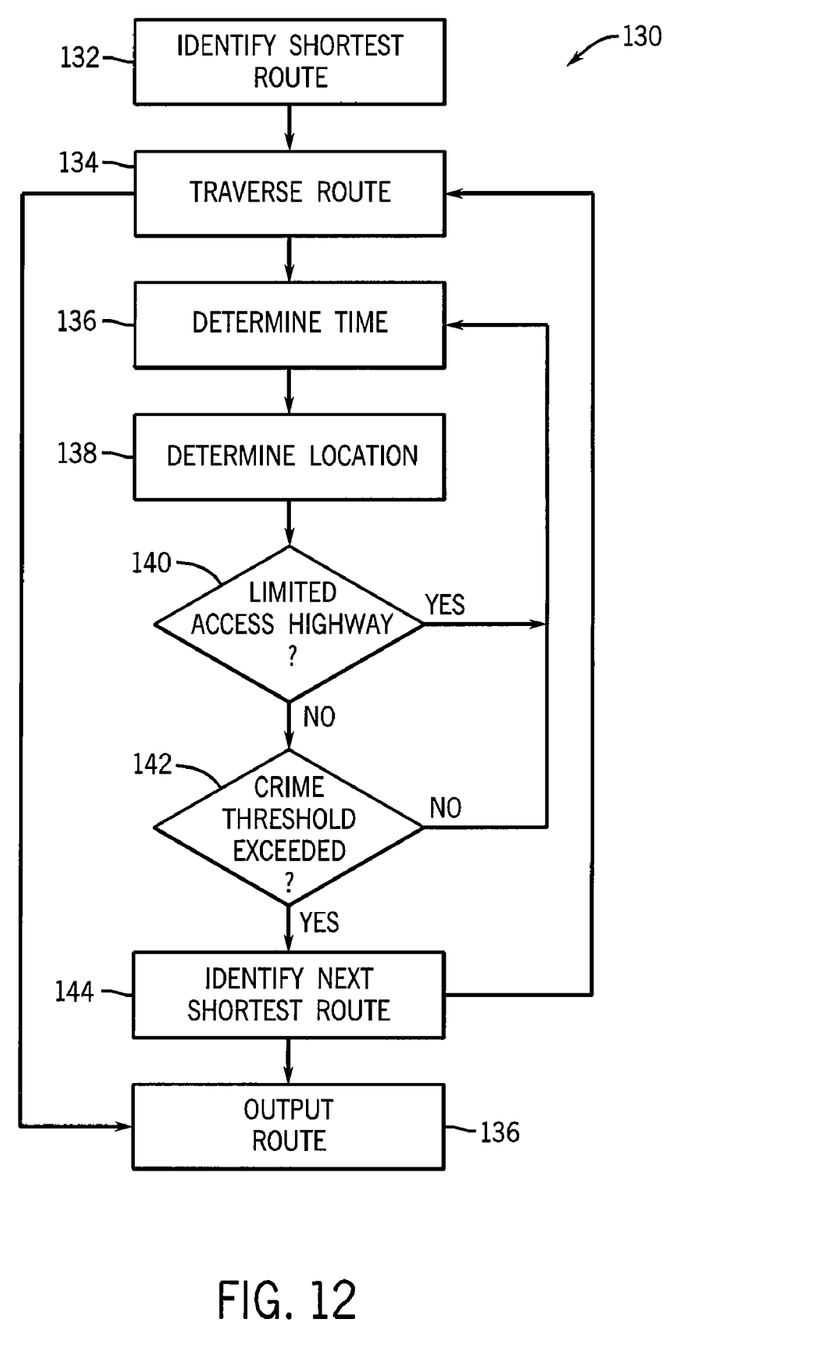
FIG. 12 is a flowchart of a program using the crime data developed by the present invention for route planning purposes.

Referring to FIG. 12, the present invention also provides a method of incorporating crime data, as described above, into the route planning process. Using the database 88 developed above with respect to FIG. 8, travel planning program 130, such as may operate on a computer similar to that described in FIG. 7, may use standard routing techniques per process block 132 to identify a shortest route between two points identified by the user. At process block, 134 that route is traversed point by point per process blocks 136-144.

If the user has identified a starting time, then as the route is traversed, that time is updated per process block 136 by regular increments and a location along the route determined at process block 138 using known statistics on road type or average traffic velocity. If the user has not identified a starting time an arbitrary time of zero is selected and the time of occurrence of the crimes is ignored.

At decision block 140, it is determined whether, at the particular location determined by process block 138, the route is on a limited access highway. If so, the program 130, loops back to process block 136 to continue traversal of the route. If at decision block 140 the user is not on a limited access highway, but instead on a local road, then at decision block 142 the crime statistics in the UTM square 112 of the location is reviewed to see whether a crime threshold (selectable by the user) has been exceeded. If not, the program 130 loops back to process block 136 to continue traversal, but if so, a new second shortest route (under the constraint of not using the road passing through the indicated crime zone) is determined and the traversal process is reinitiated looping back to process block 134. When a route has been fully traversed without exceeding the desired crime threshold, the route is output as indicated by process block 136.

This same process could be used to assess the travel risk of a particular route and assign it a quantitative value that could be used for example by shipping or trucking companies to add a safety surcharge based on whether their vehicles travel into unsafe areas.

The collection of crime data can be augmented by enlisting users of the GPS device itself. Such users, perhaps provided with an incentive with respect to obtaining crime data, can report on their perceptions of crime in the area where they live or with an advanced GPS system providing for two-way communication by entering simple data into the GPS device reflecting their perception of their current location for example "this area is safe" or "this area is unsafe". While this data would not necessarily be as reliable as other types of crime data, its quality could be factored into an assessment of total crime risk. Further this sort of data may have greater weighting near the time of the reporting.

Crime data obtained from public sources and through the use of proxies can also be augmented by crime data reported on paper the latter which may be analyzed using optical character recognition or manually input. In this way data can be collected from any source even those not reporting electronically. Finally, crime data may be collected from several different sources and combined. When crime data reports only the most serious crime, the other crimes may be inferred in certain situations.

Integrating the current crime system into a concierge service such as COMMAND from Mercedes or ONSTAR from GM could be used to increase response times for calls generated by stopped vehicles in high crime areas. While a GPS navigation receiver has been described, it will be understood that the navigation receiver may be cell phone based or other types of navigation receivers allowing real-time or near real time location determination.

It is specifically intended that the present invention not be limited to the embodiments and illustrations contained herein, but include modified forms of those embodiments including portions of the embodiments and combinations of elements of different embodiments as come within the scope of the following claims.

We claim:

1. A vehicular GPS device comprising:
 a GPS receiver providing substantially real time location information related to a position of the vehicle holding the GPS receiver;
 a graphics display;
 an electronic memory storing:
  (i) a street map; and
  (ii) crime data linked to locations;
 a computer executing a stored program and communicating with the GPS receiver, the graphics display, and the electronic memory to:
  (i) generate a dynamic display of a street map following the position of the vehicle; and
  (ii) generate multiple shaded zones in the dynamic display of the street map, the multiple shaded zones depicting the crime data in the locations of the shaded zones;
 wherein the crime data is further linked to time of day and wherein the multiple shaded zones depict the crime data only for a current predetermined time range.

2. A vehicular GPS device comprising:
 a GPS receiver providing substantially real time location information related to a position of the vehicle holding the GPS receiver;
 a graphics display;
 an electronic memory storing:
  (i) a street map; and
  (ii) crime data linked to locations;
 a computer executing a stored program and communicating with the GPS receiver, the graphics display, and the electronic memory to:
  (i) generate a dynamic display of a street map following the position of the vehicle; and
  (ii) generate multiple shaded zones in the dynamic display of the street map, the multiple shaded zones depicting the crime data in the locations of the shaded zones;
 wherein the crime data is further linked to date and wherein the multiple shaded zones depict the crime data only for a current range of dates.

3. The vehicular GPS receiver of claim 2 wherein the crime data is further linked to environmental conditions including at least one of: air temperature, phase of the moon, precipitation and wherein the multiple shaded zones depict the crime data only for corresponding environmental conditions.

4. The vehicular GPS receiver of claim 2 wherein the crime data includes severity of crime and a shading of the shaded zones maps to different degrees of crime severity.

5. A vehicular GPS device comprising:
 a GPS receiver providing substantially real time location information related to a position of the vehicle holding the GPS receiver;
 a graphics display;
 an electronic memory storing:
  (i) a street map; and
  (ii) crime data linked to locations;
 a computer executing a stored program and communicating with the GPS receiver, the graphics display, and the electronic memory to:
  (i) generate a dynamic display of a street map following the position of the vehicle; and
  (ii) generate multiple shaded zones in the dynamic display of the street map, the multiple shaded zones depicting the crime data in the locations of the shaded zones;
 wherein the street map identifies limited access highways and wherein the shading of the shaded zones is excluded in a predetermined distance from limited access highways.

6. A vehicular GPS device comprising:
a GPS receiver providing substantially real time location information related to a position of the vehicle holding the GPS receiver;
a graphics display;
an electronic memory storing:
 (i) a street map; and
 (ii) crime data linked to locations;
a computer executing a stored program and communicating with the GPS receiver, the graphics display, and the electronic memory to:
 (i) generate a dynamic display of a street map following the position of the vehicle; and
 (ii) generate multiple shaded zones in the dynamic display of the street map, the multiple shaded zones depicting the crime data in the locations of the shaded zones;
wherein the street map magnification is reduced when crime statistics are displayed to provide for a meaningful statistical crime sample.

7. A method of improving traveler safety comprising the steps of:
 (a) using a GPS receiver to obtain substantially real time location information related to a position of the vehicle holding the GPS receiver;
 (b) generating a dynamic display of a street map following the position of the vehicle using stored street map data; and
 (c) generating multiple shaded zones in the dynamic display of the street map, the multiple shaded zones depicting the crime data in the locations of the shaded zones using stored crime data linked to locations
wherein the crime data is further linked to time of day and wherein the multiple shaded zones depict the crime data only for a current predetermined time range.

8. The method of claim 7 wherein the crime data includes severity of crime and a shading of the shaded zones maps to different degrees of crime severity.

9. The method of claim 7 wherein the crime data is further linked to environmental conditions including at least one of: air temperature, phase of the moon, precipitation and wherein the multiple shaded zones depict the crime data only for corresponding environmental conditions.

10. The method of claim 7 wherein in the shaded zones provide a shading reflecting an areal density of a particular crime type.

11. A method of improving traveler safety comprising the steps of:
 (a) using a GPS receiver to obtain substantially real time location information related to a position of the vehicle holding the GPS receiver;
 (b) generating a dynamic display of a street map following the position of the vehicle using stored street map data; and
 (c) generating multiple shaded zones in the dynamic display of the street map, the multiple shaded zones depicting the crime data in the locations of the shaded zones using stored crime data linked to locations
wherein the crime data is further linked to date and wherein the multiple shaded zones depict the crime data only for a current range of dates.

12. A method of improving traveler safety comprising the steps of:
 (a) using a GPS receiver to obtain substantially real time location information related to a position of the vehicle holding the GPS receiver;
 (b) generating a dynamic display of a street map following the position of the vehicle using stored street map data; and
 (c) generating multiple shaded zones in the dynamic display of the street map, the multiple shaded zones depicting the crime data in the locations of the shaded zones using stored crime data linked to locations;
wherein the street map identifies limited access highways and wherein the shading of the shaded zones is excluded in a predetermined distance from limited access highways.

13. A method of improving traveler safety comprising the steps of:
 (a) using a GPS receiver to obtain substantially real time location information related to a position of the vehicle holding the GPS receiver;
 (b) generating a dynamic display of a street map following the position of the vehicle using stored street map data; and
 (c) generating multiple shaded zones in the dynamic display of the street map, the multiple shaded zones depicting the crime data in the locations of the shaded zones using stored crime data linked to locations;
wherein the street map magnification is reduced when crime statistics are displayed to provide for any meaningful statistical crime sample.

14. An aggregating system for crime data comprising:
an electronic computer connected to the Internet to:
 (a) visit a list of predetermined websites providing local crime data;
 (b) execute a site-specific script to extract crime types, crime locations and crime times from the site;
 (c) reformat the extracted data and provide the reformatted data to a geocoder providing a unique coordinate for each crime incident;
 (d) save the data and unique coordinate for each crime incident in a database;
 (e) query the database to find relevant crime data for a particular map area;
 (f) provide an areal crime map using the results of the queried database.

* * * * *